(12) United States Patent
Sakasai

(10) Patent No.: US 6,167,870 B1
(45) Date of Patent: Jan. 2, 2001

(54) CONTROL DEVICE AND CONTROL METHOD FOR CAM DRIVING TYPE ELECTRONIC CONTROL UNIT INJECTOR

(75) Inventor: Takashi Sakasai, Showa-machi (JP)

(73) Assignee: Komatsu Ltd., Tokyo (JP)

( * ) Notice: Under 35 U.S.C. 154(b), the term of this patent shall be extended for 0 days.

(21) Appl. No.: 09/355,044
(22) PCT Filed: Jan. 23, 1998
(86) PCT No.: PCT/JP98/00255
   § 371 Date: Jul. 22, 1999
   § 102(e) Date: Jul. 22, 1999
(87) PCT Pub. No.: WO98/32965
   PCT Pub. Date: Jul. 30, 1998

(30) Foreign Application Priority Data

Jan. 27, 1997 (JP) .................................... 9-027226

(51) Int. Cl.⁷ .................................................. F02M 37/04
(52) U.S. Cl. ........................ 123/500; 123/506; 123/467
(58) Field of Search .................... 123/446, 467, 123/500, 506

(56) References Cited

U.S. PATENT DOCUMENTS

| | | | |
|---|---|---|---|
| 4,856,482 | * | 8/1989 | Linder et al. ........................ 123/506 |
| 5,577,892 | * | 11/1996 | Schittler et al. ...................... 123/500 |
| 5,878,722 | * | 3/1999 | Gras et al. ............................ 123/506 |

FOREIGN PATENT DOCUMENTS

| | | |
|---|---|---|
| 58-091337 | 5/1983 | (JP) . |
| 59-003160 | 1/1984 | (JP) . |
| 1-237353 | 9/1989 | (JP) . |
| 8-158986 | 6/1996 | (JP) . |

* cited by examiner

*Primary Examiner*—Thomas N. Moulis
(74) *Attorney, Agent, or Firm*—Sidley & Austin

(57) ABSTRACT

The present invention is a control device and a control method for a cam driving type electronic control unit injector, in which driving force transmitting parts do not separate from a cam even when a high injection pressure is used. For this purpose, the control device includes a feed and pressure passage (18) for providing communication between an oil reservoir (16a) and a plunger chamber (11c), a valve (13) for opening and closing the feed and pressure passage (18), a first solenoid (14) for moving the valve (13) during an injection stroke to close the feed and pressure passage (18) to raise a pressure in the plunger chamber (11c), a spring (15) for pressing the valve (13) to open the feed and pressure passage (18), and a control means (20) for supplying a smaller current than that when the valve (13) is moving during the aforesaid injection stroke, through the first solenoid (14) for a predetermined period (AV2) after the lapse of a predetermined period of time (T2) immediately after completion of main injection to move the valve (13) in a closing direction of the feed and pressure passage (18) to thereby output a command for raising the pressure in the plunger chamber (11c).

4 Claims, 4 Drawing Sheets

CONTROL DEVICE AND CONTROL METHOD FOR CAM DRIVING TYPE ELECTRONIC CONTROL UNIT INJECTOR

TECHNICAL FIELD

The present invention relates to a control device and a control method for a cam driving type electronic control unit injector, and the invention particularly relates to a control device and a control method for a cam driving type electronic control unit injector for high pressure injection of a diesel engine.

BACKGROUND ART

With the improved fuel economy and power of diesel engines, a demand for environmental friendliness such as noise and emission reductions has been increasing recently. In order to obtain such contradictory performances as above at the same time, it is necessary to provide high pressure injection, improve the pattern of injection rate, and shorten the period of injection. Thus unit injectors start to be adopted. Explaining with reference to FIG. 1, such a unit injector receives a force from a cam 4 via components such as a roller 3, a push rod 5, a rocker arm 6 and the like, and injects high pressure fuel by means of a plunger 11 of a unit injector 10.

However, as high pressure injection of the unit injector 10 is used, the load exerted by the inner pressure of the plunger 11 becomes larger, thus bending the rocker arm 6 as shown by the broken line in FIG. 1. After finishing injection, the rocker arm 6, which has been bent during the high pressure injection, is bent in reverse by reaction force as shown by the two-dot chain line, thereby causing a so-called jump phenomenon in which driving system parts (driving force transmitting parts) separate from the cam 4. In this situation, the driving force transmitting parts hit the surface of the cam 4, thereby causing an impact force. This impact not only becomes a significant source of noise, but also causes the disadvantage of severely deteriorating the durability of the driving force transmitting parts.

DISCLOSURE OF THE INVENTION

Mitigating the aforesaid disadvantage, the present invention is made, and its object is to provide a control device and a control method for a cam driving type electronic control unit injector, in which driving force transmitting parts will not separate from a cam, with less impact force and noise being caused, even when a high injection pressure is used.

A control device for a cam driving type electronic control unit injector according to the present invention is a control device for a cam driving type electronic control unit injector including a cam driving type plunger having the function of a reciprocating pump, a structure in which fuel is discharged from a plunger chamber formed at one end portion side of the plunger during an injection stroke and fuel is taken into the plunger chamber during a fuel charge stroke, and a fuel injection nozzle placed below the plunger chamber, characterized by including:

an oil reservoir communicating with a low pressure fuel source passage and a drain passage, a feed and pressure passage for providing communication between the oil reservoir and the plunger chamber, a valve for opening and closing the feed and pressure passage, a first solenoid for moving the valve during the injection stroke to close the feed and pressure passage to raise a pressure in the plunger chamber, a spring or a second solenoid, which presses the valve to open the feed and pressure passage, and a control means for supplying a smaller current than that when the valve is moving during the injection stroke, through the first solenoid for a predetermined period after the lapse of a predetermined period of time immediately after the completion of main injection during the injection stroke to move the valve in a closing direction of the feed and pressure passage to thereby output a command for raising the pressure in the plunger chamber.

According to the above configuration, when the cam is rotated and reaches a predetermined position, the control means outputs a command to the first solenoid and operates the valve against the spring or the second solenoid to close the valve. Further as a result of the cam rotating, the plunger is pressed down to thereby carry out main injection. In this situation, large loads are exerted on the driving force transmitting parts placed between the cam and the plunger, for example, a bending load is on the rocker arm, and a compression load is on the push rod. After the lapse of the predetermined period of time immediately after the completion the main injection, specifically, before the valve is completely returned to the original position, a smaller current is supplied through the first solenoid once again to operate the valve in the closing direction for the predetermined period once again. The valve operates in the closing direction, thereby raising the pressure in the plunger chamber. As a result of the rise in pressure, for example, the load exerted on the rocker arm is not abruptly reduced to zero from the maximum load. As a result, the rocker arm is not bent in reverse, and the driving force transmitting parts are abutted to one another to be driven, thus eliminating a so-called jumping phenomenon in which the driving force transmitting parts separate from the cam. For this reason, impact force, which causes the driving force transmitting parts to hit the cam surface, does not occur, and noises caused by the impact can be prevented. Further the durability of the driving force transmitting parts is dramatically increased.

It may be suitable to include a speed sensor for detecting the speed of an engine, a position sensor for detecting an operating amount of an accelerating means of the engine, and an angle sensor for detecting the rotational angle of the cam, and the control means may receive signals from the speed sensor, the position sensor, and the angle sensor, obtain the predetermined period of time immediately after the completion of the main injection and the predetermined period during which the smaller current is supplied, and output the obtained values to the first solenoid.

According to the above configuration, the control means obtains the predetermined period of time and the predetermined period according to the engine speed, the operating amount (load exerted on the engine) of the accelerating means, and changes the predetermined period of time and/or the predetermined period during which the current is supplied through the first solenoid. As a result, the position and the magnitude of the pressure, at which the pressure in the plunger chamber is raised once again, become variable according to the engine speed and the load exerted on the engine, thus enabling to generate pressure in the plunger chamber in response to a load exerted on the driving force transmitting parts for driving the unit injector.

A control method for a cam driving type electronic control unit injector is a control method for a cam driving type electronic control unit injector in which the driving force from a cam is transmitted to a plunger of a unit injector via driving force transmitting parts including at least a push rod and a rocker arm to inject fuel by means of the plunger, characterized by including the step of:

after the lapse of a predetermined period of time immediately after the completion of main injection, producing pressure in a plunger chamber of the plunger for a predetermined period and pressing each of the driving force transmitting parts so that each of them is not separated.

According to the above configuration, after the lapse of the predetermined period of time immediately after the completion of the main injection in which the plunger is pressed down, predetermined pressure lower than that in the main injection is generated in the plunger chamber for the predetermined period. Due to the pressure, as in the aforesaid invention of the control device, the load exerted on the rocker arm is not abruptly reduced to zero from the maximum load. As a result, the rocker arm is not bent in reverse, and the driving force transmitting parts are always abutted to one another to be driven, therefore eliminating a so-called jump phenomenon. As a result, the impact force, which causes the driving force transmitting parts to hit the cam surface, does not occur, and a noise caused by the impact can be prevented. Further, the durability of the driving force transmitting parts can be dramatically increased.

The predetermined period of time and the predetermined period may be calculated according to the speed of an engine and the load exerted on the engine.

According to the above configuration, when the predetermined pressure is generated in the plunger chamber once again after the completion of the main injection, the predetermined period of time and/or the predetermined period are/is changed in response to the engine speed and the load exerted on the engine. Thus, as in the aforesaid invention of the control device, the position and the magnitude of the pressure, at which the pressure in the plunger chamber is raised once again, becomes variable in response to the engine speed and the load exerted on the engine, thereby enabling to generate the pressure in the plunger chamber in response to the loads exerted on the driving force transmitting parts for driving the unit injector.

BEST MODE FOR CARRYING OUT THE INVENTION

A preferred embodiment of a control device and a control method for a cam driving type electronic control unit injector according to the present invention will be described in detail below with reference to the drawings.

Figure 1:
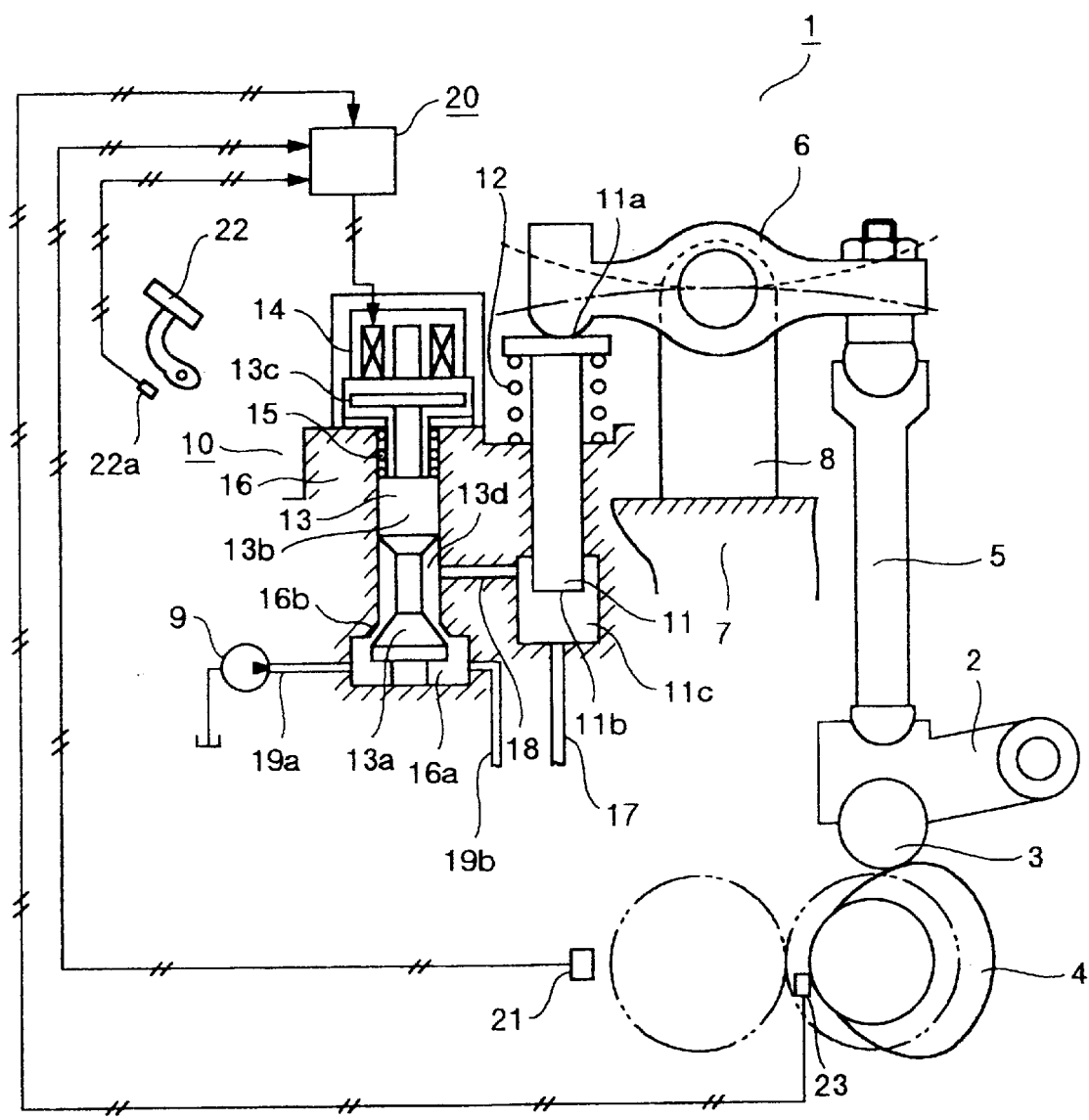
FIG. 1 is a schematic block diagram of a control device for a cam driving type electronic control unit injector of the present invention.

FIG. 1 is a sectional view of a control device 1 for a cam driving type electronic control unit injector of the present invention. In FIG. 1, a roller 3, which is rotatably supported by a cam follower 2, is provided to abut to a cam 4. One end of a push rod 5 is supported by the cam follower 2 to be free to swing, and the other end of the push rod 5 is supported by one end portion of a rocker arm 6 to be free to swing. In the rocker arm 6, the center portion is rotatably supported by an engine head 7, while the other end portion abuts one end face 11a of a plunger 11 of a unit injector 10. The unit injector 10 includes the plunger 11, a plunger spring 12, a solenoid valve 13, a solenoid 14 (hereinafter called a first solenoid 14), a valve spring (spring) 15, and a body 16. A plunger chamber 11c is formed at the other end portion 11b side of the plunger 11, and part of the other end portion 11b of the plunger 11 is inserted in the plunger chamber 11c. The plunger spring 12 is provided at the one end face 11a side of the plunger 11. The plunger spring 12 is provided so that the one end face thereof abuts to the plunger 11 and the other end face abuts to the body 16. The plunger spring 12 presses the plunger 11 so that the plunger 11 abuts to the other end portion of the rocker arm 6. A fuel injection nozzle not shown is provided below the plunger chamber 11c, and a pressure passage 17 communicating with the fuel injection nozzle is formed on the bottom surface of the plunger chamber 11c.

The solenoid valve 13 is constructed to be in a three-segmented form, and the center side of one end portion thereof is formed to be a conical form 13a, which abuts to the body 16 to block the passage. A cylinder portion 13b at the central portion thereof is closely and slidably inserted in the body 16 to slidably hold the solenoid valve 13. The other end portion of the solenoid valve 13 is formed to be a disc form 13c, and a first solenoid 14 is placed near the other end surface of the disc form 13c. The solenoid valve 13 is placed in parallel with the plunger 11 with the disc form 13c at the other end portion being on the top thereof. A circular oil reservoir 16a is formed in the vicinity of the conical form 13a portion at the lower side of the solenoid valve 13, adjacent to the plunger chamber 11c. The conical form 13a portion of the solenoid valve 13 is inserted in the circular oil reservoir 16a, and a conical sheet surface 16b is formed on the oil reservoir 16a opposing the conical form 13a portion.

A space portion 13d between the conical form 13a at one end portion of the solenoid valve 13 and the cylinder portion 13b at the center thereof is connected to the side surface portion of the plunger chamber 11c via a feed and pressure passage 18. The solenoid valve 13 operates as a valve for opening and closing the feed and pressure passage 18. The space portion 13d and the circular oil reservoir 16a are connected via the conical sheet surface 16b. A low pressure fuel source passage 19a through which the fuel from a fuel pump 9 is fed is provided at one side surface portion of the oil reservoir 16a, and a drain passage 19b is provided at the other side surface portion of the oil reservoir 16a. The valve spring 15 is placed between the cylinder portion 13b and the disc form 13c of the solenoid valve 13, and the valve spring 15 presses the solenoid valve 13 so that the lower end surface thereof abuts to the body 16. As for the valve spring 15, a solenoid not shown (referred to as a second solenoid) may be used. When the second solenoid is used, a pressing operation is performed in response to a command from a control element 20.

The first solenoid 14 is placed near the top of the solenoid valve 13. The first solenoid 14 is connected to the control element 20, and pulls in the solenoid valve 13 in response to a command from the control element 20. When the solenoid valve 13 performs a pull-in operation, the conical form 13a of the solenoid valve 13 abuts to the conical sheet surface 16b of the oil reservoir 16a to provide blockage between the plunger chamber 11c and the oil reservoir 16a. The plunger 11 and the solenoid valve 13 are closely and slidably inserted into the body 16 so that the body 15 slidably holds the plunger 11 and the solenoid valve 13. The body 16 is attached to the engine head 7.

A speed sensor 21 for detecting engine speed is attached to the output shaft of the engine, and outputs a signal of the engine speed to the control element 20. A position sensor 22a is attached at an accelerator pedal (an accelerating means) 22 and a signal corresponding to the operating amount of the accelerator pedal 22 is outputted to the control element 20. In the present embodiment, as an example of the detection of the load exerted on the engine, the operating amount of the accelerator pedal 22 is used. An angle sensor 23 is provided at the shaft of the cam 4 to output the rotational angle of the cam 4 to the control element 20.

Figure 2:
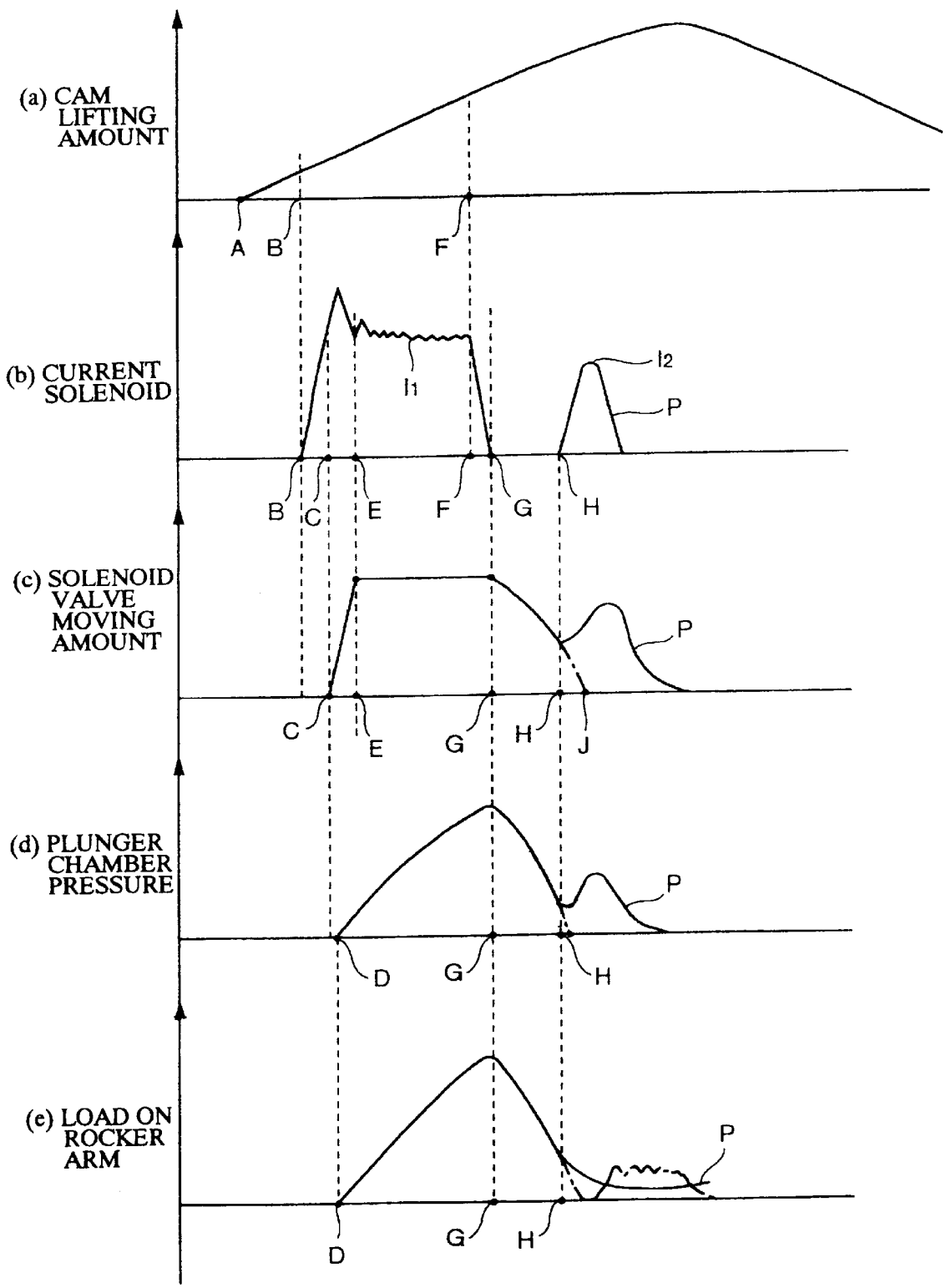
FIG. 2 is a timing chart of the control method for the cam driving type electronic control unit injector of the present invention.

The operation according to the above configuration will be explained. In FIG. 2, FIG. 2 (a) shows the lifting amount of the cam 4, FIG. 2 (b) shows the electric current of the first solenoid 14 based on the command of the control element 20, FIG. 2 (c) shows the moving amount of the solenoid valve 13, FIG. 2 (d) shows the pressure in the plunger chamber 11c, and FIG. 2 (e) shows the load exerted on the rocker arm 6. In FIG. 2, the solid lines show the data of the present invention, and the alternate long and short dash lines show the data obtained in the situation in which the same control as in the prior art is carried out. It should be noted that the data shown by the solid line and given a symbol P are the data obtained with a renewed driving current.

In FIG. 2 (a), the lifting amount of the cam 4 is zero at a point A. From the point A, the cam 4 is rotated, and at a predetermined position, a point B, shown in FIG. 2 (b), the control element 20 receives a signal from the angle sensor 23 of the cam 4, and produces an output so as to supply a driving current I1 through the first solenoid 14. When the first solenoid 14 has the driving current I1, the solenoid valve 13 starts to move from a point C as shown in FIG.2 (c). After the solenoid valve 13 starts to move, and just before the conical form 13a of the solenoid valve 13 closely abuts to the conical sheet surface 16b of the oil reservoir 16a, or to put it another way, just before blockage is provided between the plunger chamber 11c and the oil reservoir 16a, specifically, from a point D in FIG. 2 (d), the pressure in the plunger chamber 11c starts to rise. Following this, as shown in FIG. 2 (e), the load exerted on the rocker arm 6 starts to rise.

When the cam 4 is further rotated, and when the solenoid valve 13 reaches a predetermined position, a point E, as shown in FIG. 2 (c), the conical form 13a of the solenoid valve 13 closely abuts to the conical sheet surface 16b of the oil reservoir 16a to provide complete blockage between the plunger chamber 11c and the circular oil reservoir 16a. Thereby, as shown in FIG. 2 (b), the driving current I1 is almost constantly supplied through the first solenoid 14.

Further, when the cam 4 is rotated and reaches a predetermined position, a point F, shown in FIG. 2 (a), the control element 20 receives a signal from the angle sensor 23 of the cam 4, and starts to gradually decrease the driving current I1, which is supplied through the first solenoid 14, to reduce it to zero at the position of a point G as shown in FIG. 2 (b). As shown in FIG. 2 (c), the solenoid valve 13 starts to return from the position of the point G to start to provide communication between the plunger chamber 11c and the oil reservoir 16a. At the position of the point G, as shown in FIG. 2 (d), the pressure in the plunger chamber 11c reaches the maximum injection pressure. Following this, as shown in FIG. 2 (e), the load exerted on the rocker arm 6 becomes the maximum. As a result, the rocker arm 6 is bent as shown by the broken line in FIG. 1.

In the present invention, the cam 4 is further rotated, and when it reaches a predetermined position at a point H shown in FIG. 2 (b), the control element 20 receives a signal from the angle sensor 23 of the cam 4, and issues a command to supply a renewed driving current I2 through the first solenoid 14. The renewed driving current I2 is smaller than the driving current I1. Meanwhile, if it is similar to the prior art, the solenoid valve 13 is completely returned at the position of a point J as shown in FIG. 2 (c) to provide complete communication between the plunger chamber 11c and the oil reservoir 16a. However, in the present invention, the renewed driving current I2 is supplied, thereby moving the solenoid valve 13 in the closing direction once again at a midpoint, the point H, to reduce the space between the plunger chamber 11c and the oil reservoir 16a. As a result, as shown in FIG. 2 (d), the pressure in the plunger chamber 11c is slightly increased. Thereby a little pressure is left therein. This little pressure prevents the load exerted on the rocker arm 6 from abruptly decreasing to zero from the maximum load as shown in FIG. 2 (e). Accordingly, the rocker arm 6 is not bent in reverse as shown by the two-dot chain line in FIG. 1. With a little pressure remaining, the driving system components such as the cam follower 2, the roller 3, the cam 4, and the push rod 5 are always abutted to one another to be driven, and a so-called jump phenomenon, in which the driving components separate from the cam, is prevented. Consequently, an impact force caused by the driving system hitting the surface of the cam 4 does not occur, and the noise (about 2 dB to 3 dB) following the impact is decreased. In addition, the durability of the driving system can be dramatically increased.

Figure 3:
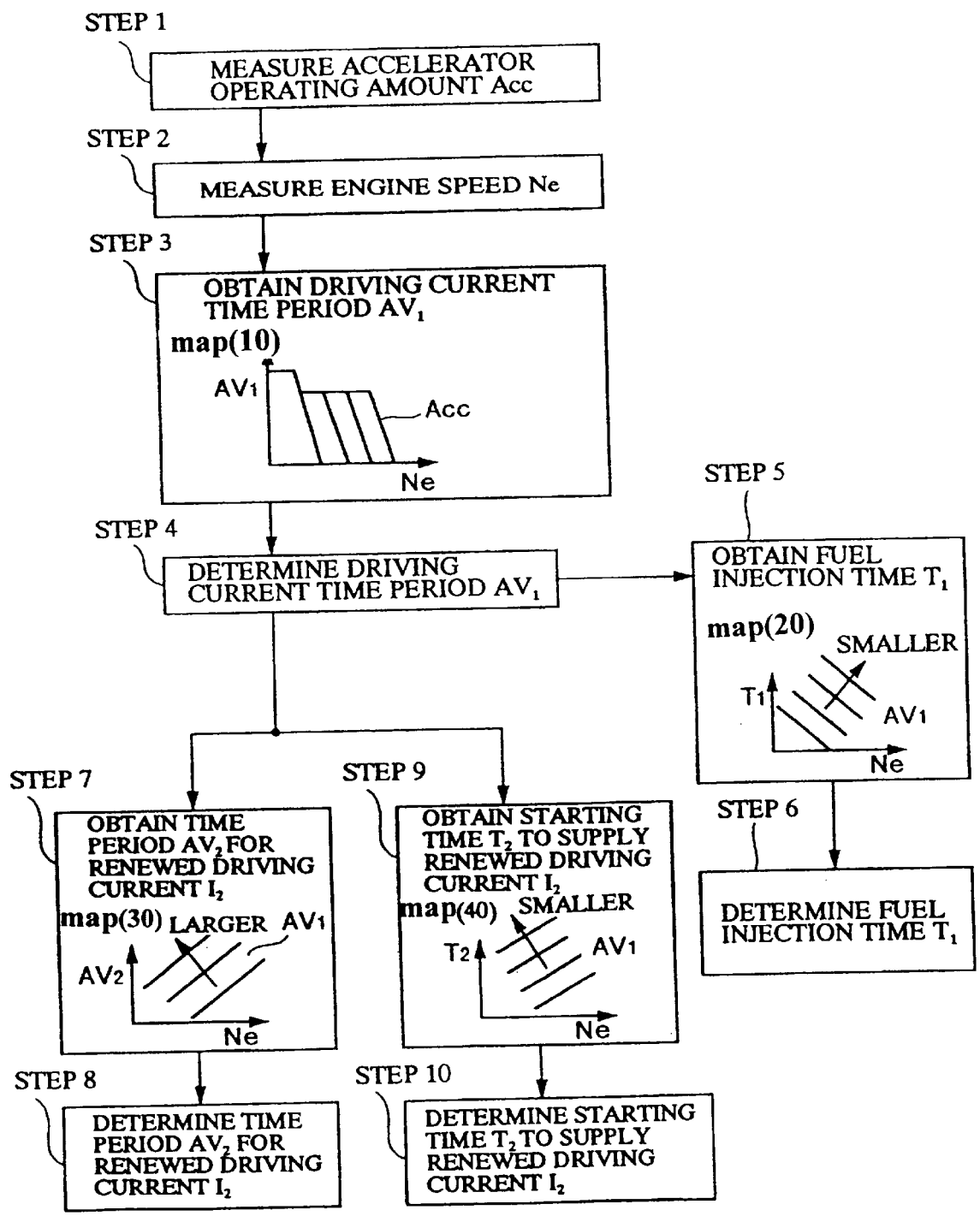
FIG. 3 is a flowchart of the control of the cam driving type electronic control unit injector of the present invention.

Next, the control in the above configuration will be explained. In FIG. 3, in Step 1, an operating amount Acc of the accelerator pedal 22 is detected by means of the position sensor 22a of the accelerator pedal 22, and the signal thereof is read into the control element 20. In Step 2, an engine speed Ne is detected by means of the speed sensor 21, and the signal thereof is read into the control element 20.

In Step 3, a map (10) is previously stored in the control element 20. The map (10) is a fuel injection amount control plot in which the engine speed Ne is plotted in the horizontal axis, and the fuel injection amount is plotted in the vertical axis. In the map (10), the vertical axis, specifically, the fuel injection amount is taken as a period of time AV1 during which the driving current I1 is supplied through the first solenoid 14. The control element 20 obtains the period of time AV1 during which the driving current I1 is supplied through the first solenoid 14 based on the map (10), and the engine speed Ne and the operating amount Acc of the accelerator pedal 22 which are read in Step 1 and Step 2. In Step 4, the period of time AV1 during which the driving current I1 is supplied through the first solenoid 14 is determined.

In Step 5, a map (20) is previously stored in the control element 20. In the map (20), the engine speed Ne is plotted in the horizontal axis, a fuel injection time T1 is plotted in the vertical axis, and the period of time AV1 for the driving current is a parameter. The controller 20 obtains the fuel injection time T1 based on the map (20) and the determined period of time AV1 of the driving current. In Step 6, the fuel injection time T1 is determined.

In Step 7, a map (30) is previously stored in the control element 20. In the map (30), the engine speed Ne is plotted in the horizontal axis, a period of time (period) AV2 during which the renewed driving current I2 is supplied through the first solenoid 14 is plotted in the vertical axis, and the period of time AV1 of the driving current I1 is a parameter. The control element 20 obtains the period of time AV2 during which the renewed driving current I2 is supplied through the first solenoid 14 based on the map (20) and the determined period of time AV1 for the driving current I1. In Step 8, the period of time AV2 during which the renewed driving current I2 is supplied through the first solenoid 14 is determined.

In Step 9, a map (40) is previously stored in the control element 20. In the map (40), the engine speed Ne is plotted in the horizontal axis, a period of time T2 before which the renewed driving current I2 starts to be supplied is plotted in the vertical axis, and the period of time AV1 for the driving current I1 is a parameter. The control element 20 obtains a period of time (predetermined period of time) T2 which is from the point of time after the completion of main fuel injection, specifically, after the lapse of the period of time AV1 during which the driving current I1 is supplied until the renewed driving current I2 starts to be supplied. In Step 10, the period of time T2 is determined.

Figure 4:
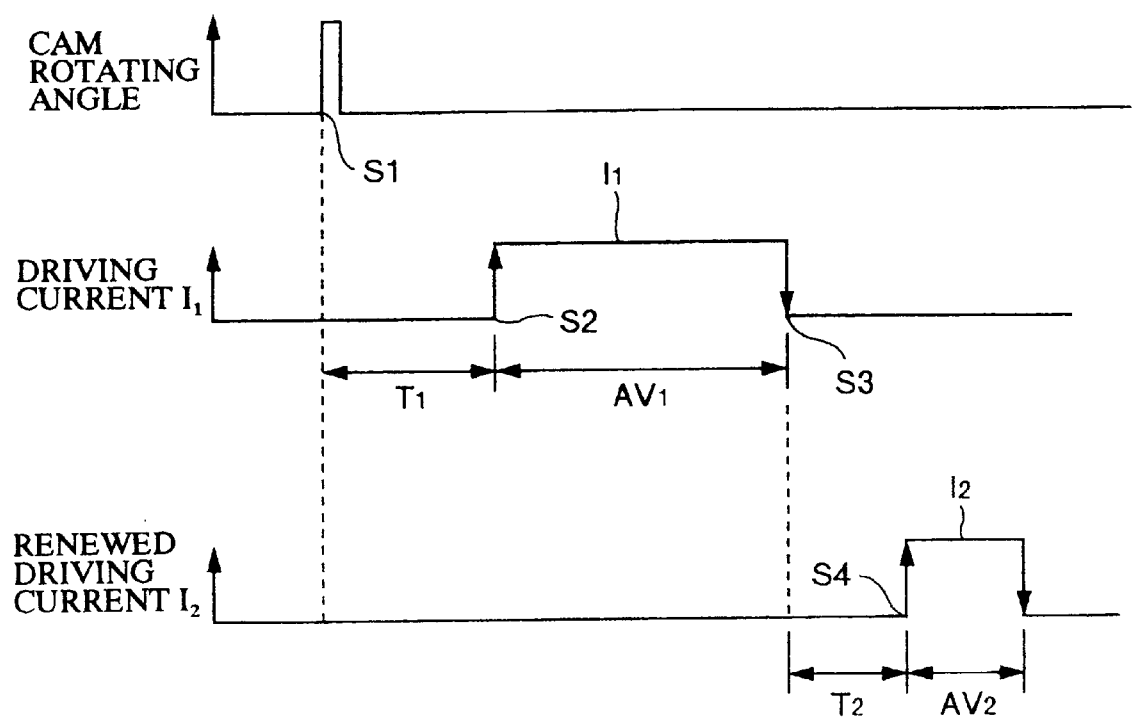
FIG. 4 is a timing chart of a driving current and a renewed driving current which are supplied through a solenoid from a control element of the cam driving type electronic control unit injector of the present invention.

The control element 20 outputs a command as shown in FIG. 4 based on the results obtained according to the above. Specifically, after the control element 20 receives a signal S1 from the angle sensor 23 of the cam 4, at the starting position S2 of the fuel injection time T1, the control element 20 outputs a command for supplying the driving current I1 for the predetermined period of time AV1. Thereby the first solenoid 14 is operated, the conical form 13a of the solenoid valve 13 is closely abutted to the conical sheet surface 16b of the oil reservoir 16a to provide complete blockage between the plunger chamber 11c and the oil reservoir 16a, thus carrying out the main injection. Further, the control element 20 measures the period of time T2 from the position S3 immediately after the lapse of the period of time AV1 until the solenoid valve 13 moves in the renewed closing direction at a midpoint, and the renewed driving current I2 for decreasing the space between the plunger chamber 11c and the oil reservoir 16a starts to be passed. At the position S4 immediately after the lapse of the period of time T2, the control element 20 outputs a command for supplying the renewed driving current I2 for the period of time AV2.

As a result, the pressure in the plunger chamber 11c slightly rises, and a little pressure remains. In the above, either the renewed driving current I2 or the period of time AV2 may be set as a fixed value. In this case, the renewed driving current I2 and the period of time T2 during which the renewed driving current I2 is supplied are made larger when the engine speed and the operating amount of the accelerator pedal 22 are in a larger range.

INDUSTRIAL APPLICABILITY

The present invention is useful as a control device and a control method for a cam driving type electronic control unit injector with less impact force and noise being caused, in which driving force transmitting parts do not separate from a cam even when a high injection pressure of the unit injector is used.

What is claimed is:

1. A control device for a cam driving type electronic control unit injector including a cam driving type plunger having the function of a reciprocating pump, a structure in which fuel is discharged from a plunger chamber formed at one end portion side of said plunger during an injection stroke and fuel is taken into said plunger chamber during a fuel charge stroke, and a fuel injection nozzle placed below said plunger chamber, said control device, comprising:

an oil reservoir communicating with a low pressure fuel source passage and a drain passage;

a feed and pressure passage for providing communication between said oil reservoir and said plunger chamber;

a valve for opening and closing said feed and pressure passage;

a first solenoid for moving said valve during an injection stroke to close said feed and pressure passage to raise a pressure in said plunger chamber;

a spring or a second solenoid, which presses said valve to open said feed and pressure passage; and a control means for supplying a smaller current than that when said valve is moving during the injection stroke, through the first solenoid for a first predetermined period after the lapse of a second predetermined period of time immediately after the completion of main injection during the injection stroke to move said valve in a closing direction of said feed and pressure passage to thereby output a command for raising the pressure in said plunger chamber.

2. The control device for the cam driving type electronic control unit injector in accordance with claim 1, further comprising:

a speed sensor for detecting the speed of an engine;

a position sensor for detecting an operating amount of an accelerator means of said engine; and an angle sensor for detecting the rotational angle of said cam, said control means receiving signals from said speed sensor, said position sensor, and said angle sensor, obtaining the second predetermined period of time immediately after the completion of the main injection and the first predetermined period during which the smaller current is supplied, and outputting the obtained values to said first solenoid.

3. A control method for a cam driving type electronic control unit injector in which the driving force from a cam is transmitted to a plunger of a unit injector via driving force transmitting parts including at least a push rod and a rocker arm to inject fuel by means of said plunger, comprising the step of:

after the lapse of a first predetermined period of time immediately after the completion of main injection, producing pressure in a plunger chamber of said plunger for a second predetermined period and pressing each of said driving force transmitting parts so that each of them is not separated.

4. The control method for the cam driving type electronic control unit injector in accordance with claim 3, wherein said first predetermined period of time and said second predetermined period are calculated according to a speed of an engine and a load exerted on said engine.

* * * * *